(12) United States Patent
Border et al.

(10) Patent No.: US 8,816,939 B2
(45) Date of Patent: Aug. 26, 2014

(54) MONOCULAR DISPLAY APPARATUS

(75) Inventors: John Norvold Border, Walworth, NY (US); Amit Singhal, Pittsford, NY (US)

(73) Assignee: Kodak Alaris Inc., Rochester, NY (US)

( * ) Notice: Subject to any disclaimer, the term of this patent is extended or adjusted under 35 U.S.C. 154(b) by 310 days.

(21) Appl. No.: 12/987,184

(22) Filed: Jan. 10, 2011

(65) Prior Publication Data

US 2012/0176296 A1    Jul. 12, 2012

(51) Int. Cl.
*G09G 3/16* (2006.01)

(52) U.S. Cl.
USPC .................................................. 345/8; 348/56

(58) Field of Classification Search
CPC ............ G02B 27/2228; G02B 27/017; G02B 2027/0143; G09G 3/003
USPC ................. 348/40–60, 8; 345/7, 698
See application file for complete search history.

(56) References Cited

U.S. PATENT DOCUMENTS

| | | | |
|---|---|---|---|
| 6,452,572 B1 | 9/2002 | Fan et al. | |
| 6,563,513 B1 * | 5/2003 | Yu et al. | 345/698 |
| 6,680,802 B1 | 1/2004 | Ichikawa et al. | |
| 6,771,424 B1 | 8/2004 | Amafuji et al. | |
| 7,755,667 B2 | 7/2010 | Rabbani et al. | |
| 8,179,423 B2 * | 5/2012 | Maruyama et al. | 348/42 |
| 8,378,924 B2 * | 2/2013 | Jacobsen et al. | 345/7 |
| 2008/0180521 A1 * | 7/2008 | Ahearn | 348/42 |
| 2011/0134227 A1 * | 6/2011 | Shin | 348/54 |

OTHER PUBLICATIONS

Sukthankar etal, Smarter Presentations: Exploiting Homography in Camera-Projector Systems, 2001 Proc. of International Conf. on Computer Vision.

* cited by examiner

*Primary Examiner* — William C Vaughn, Jr.
*Assistant Examiner* — Naod Belai
(74) *Attorney, Agent, or Firm* — Hogan Lovells US LLP

(57) ABSTRACT

An apparatus for viewing of an image of a scene, including a monocular device worn by a viewer which includes a first display for displaying a first two-dimensional image of the scene with a first perspective to one eye of the viewer. a second display for displaying a second two-dimensional image of the scene with a second perspective to the other eye of the viewer, wherein the first perspective of the scene is different from the second perspective of the scene so that the viewer perceives a three dimensional image of the scene, while another viewer of the second display, that is not wearing a monocular device, views the two-dimensional image of the scene.

17 Claims, 18 Drawing Sheets

MONOCULAR DISPLAY APPARATUS

CROSS REFERENCE TO RELATED APPLICATIONS

Reference is made to commonly assigned U.S. patent application Ser. No. 12/987,189 filed concurrently herewith, entitled "Alignment of Stereo Images Pairs For Viewing" by John N. Border et al; U.S. patent application Ser. No. 12/987,192 filed concurrently herewith, entitled "Three Channel Delivery of Stereo Images" by John N. Border et al; and U.S. patent application Ser. No. 12/987,194 filed concurrently herewith, entitled "Rotational Adjustment For Stereo Viewing" by John N. Border, the disclosures of which are incorporated herein.

FIELD OF THE INVENTION

The present invention pertains to a method for viewing stereo image pairs by viewing one image on a display with one eye and viewing the other image on a monocular device with the other eye.

BACKGROUND OF THE INVENTION

Stereoscopic images of a scene are produced by viewing two (or more) images with different perspectives of a scene in a stereo image pair. One image in the stereo image pair is viewed with one eye and the other image in the stereo image pair is viewed with the other eye. The viewing of the two images can be done simultaneously or in an alternating fashion provided the alternating images are presented fast enough that the image changes are not perceptible to the viewer. It is the differences in perspectives between the two (or more) images in the stereo image pair that provide a perception of depth to the viewer. To provide different perspectives in stereo image pairs, typically pairs of images are captured simultaneously with an image capture device that has two (or more) image capture devices that are separated by a distance to provide different perspectives of the scene. A single stereo image pair can be used to provide a still stereoscopic image of a scene. A series of sequential stereo image pairs can be used to provide a stereoscopic video of a scene. Typically the two images in a stereo image pair include a left image and a right image where the left image has a perspective as seen by the viewer's left eye and the right image has a perspective as seen by the viewer's right eye.

Methods for viewing stereoscopic images are well known in the art. Methods include head mounted displays where the left and right images in a stereo image pair are presented to the left and right eyes of the viewer. Another method includes a display that alternately presents a right image and a left image and the viewer wears shutter glasses that are synchronously operated with the display such that the right eye of the viewer is permitted to see the display only when the right image is presented and the left eye of the viewer is permitted to see the display only when the left image is presented. Yet another method includes a display that alternately presents a right image and a left image to the viewer wherein the polarization of the right image is different from the left image and the viewer wears polarized glasses such that the viewer's right eye can only see the right image and the viewer's left eye can only see the left image. A further method of viewing stereoscopic images is provided by a display that divides the images in a stereo image pair into vertical segments with optical limiters such that the right eye of the viewer can only see the divided vertical segments of the right image and the left eye of the viewer can only see the divided vertical segments of the left image. In all these methods for viewing stereoscopic images, it is difficult for multiple viewers to simultaneously view both stereoscopic images and non-stereoscopic images. In addition, viewers do not find it comfortable to wear glasses for all types of image viewing.

Monocular devices for presenting an image to one eye of a viewer are also well known in the art. U.S. Pat. No. 6,452,572 describes several different types of monocular head mounted display devices where the monocular display can be adjusted to suit the preferences of the viewer and the monocular device can be moved in and out of the viewer's field of view. U.S. Pat. No. 6,680,802 discloses a monocular head mounted display device which utilizes a see-thru prism to allow images to be presented to the viewer while the viewer can simultaneously view the surrounding environment. U.S. Pat. No. 6,771,424 discloses a head mounted display for one eye with a holder that contacts the sides and front of the head. However, methods for viewing stereo image pairs using a monocular device are not described.

Therefore, a need persists for providing multiple viewers the option to simultaneously view either a non-stereoscopic image or a stereoscopic image.

SUMMARY OF THE INVENTION in accordance with the present invention there is provided, apparatus for viewing of images of a scene, comprising:

(a) an image delivery system for providing first and second two dimensional images of the scene wherein the first and second images respectively have first and second different perspectives of the scene;

(b) a monocular device wearable by a viewer which includes a first display for displaying the first two-dimensional images of the scene to one eye of the viewer; and (c) a second display, located remotely to the first display, for displaying the second two-dimensional images of the scene to the other eye of the viewer, so that the viewer perceives three dimensional images of the scene, while another viewer of the second display, that is not wearing a monocular device, views two-dimensional images of the scene.

The invention includes a method for presenting an image to multiple viewers on a display while simultaneously presenting an associated image from a stereo image pair on a monocular device to at least one of the viewers to provide a stereoscopic image experience.

BRIEF DESCRIPTION OF THE DRAWINGS

Embodiments of the invention are better understood with reference to the following drawings.

DETAILED DESCRIPTION OF THE INVENTION

Figure 1:
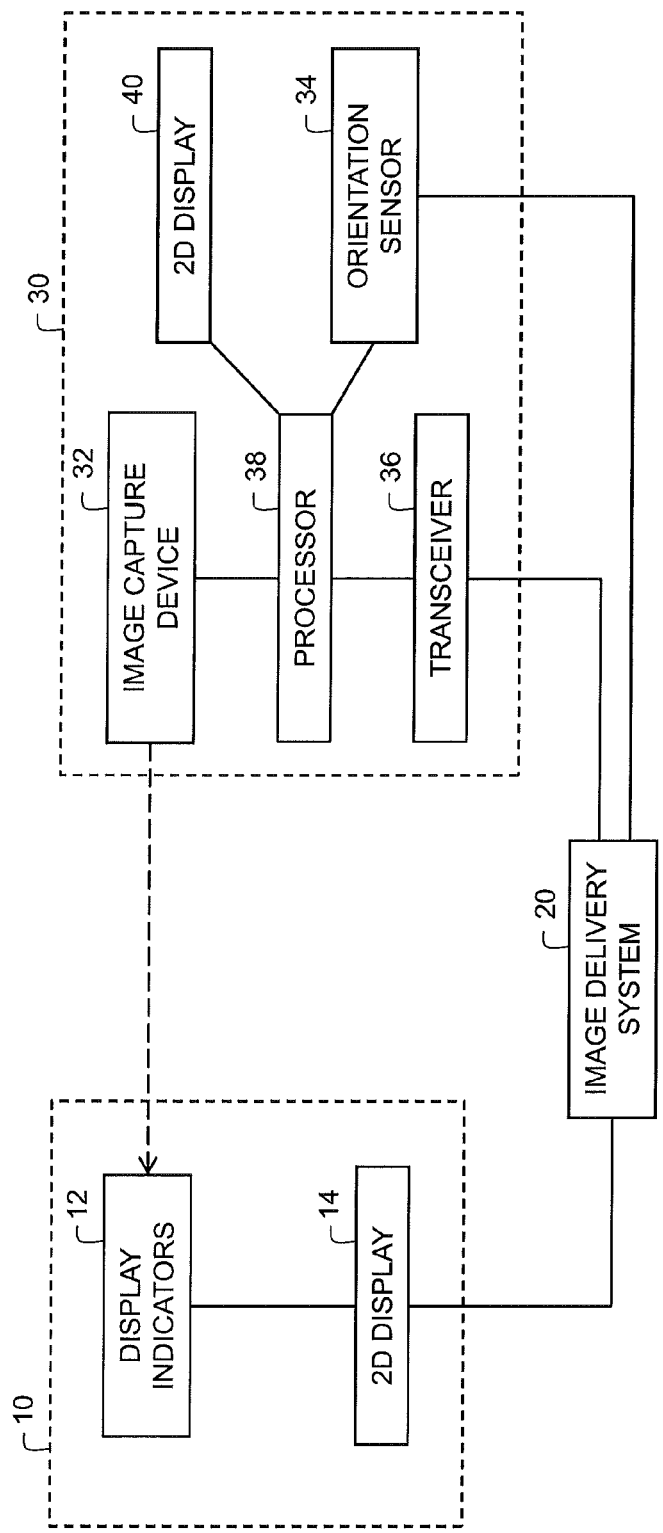
FIG. 1 is a block diagram of an embodiment of the system of the invention.

Providing images with perceived depth, also known as stereoscopic images or three dimensional images, to a viewer requires two or more two dimensional images with different perspectives to be presented in a way that the viewer's left and right eyes view images of the same scene but with different perspectives. For the simplest case of stereo images, two two-dimensional images with different left and right perspectives are presented to a viewer in the form of a stereo image pair where the stereo image pair respectively includes an image for the left eye of the viewer and an image for the right eye of the viewer. Because the left eye image has a different perspective of the scene compared to the right eye image, the viewer perceives a stereoscopic image with perceived depth. A video with perceived depth, also known as a stereoscopic video, includes a series of synchronized stereo image pairs that are presented sequentially to the viewer.

The invention provides a method for viewing images and videos with perceived depth wherein one of the two-dimensional images in each stereo image pair is provided by a remote display to one eye of the viewer and the other two-dimensional image in the stereo image pair is provided to the other eye of the viewer by a monocular device that is wearable by the viewer. The viewer simultaneously views one image from each stereo image pair on the remote display with one eye, while the other eye views the other image from the stereo image pair on the monocular device. Multiple viewers can view the images presented on the remote display in a two-dimensional form, while the viewer simultaneously views stereoscopic images including stereo image pairs by viewing one image of each stereo image pair on the remote display and the other image of the stereo image pair on the monocular device. The invention also provides for multiple viewers to view stereoscopic images including stereo image pairs by using multiple monocular devices wherein each viewer wears their own monocular device.

The invention provides an apparatus for viewing stereoscopic image pairs of a scene. The apparatus includes a monocular device worn by the viewer on one eye along with a second remote display that is viewable by the viewer's other eye. The monocular device includes a first display (also referred to herein as the monocular display) for displaying a first two-dimensional image of the scene with a first perspective of the scene. A second display (also referred to herein as the remote display) is located at a distance from the first display and it displays a second two-dimensional image of the scene with a second perspective of the scene. The viewer views the first and second two-dimensional images of the scene simultaneously so that a stereoscopic image with perceived depth is perceived by the viewer. The monocular device can be any type of display that presents an image to one eye of the viewer while allowing the viewer to view a second remote display including: opaque displays, retinal displays or see-through displays. In an opaque display, the display blocks the viewer from seeing the surrounding environment so that the viewer can only see the image provided by the display. In contrast to the opaque display, a see-through display is semi-transparent so that the viewer sees the image provided by the display in combination with, or overlaid onto, the view of the surrounding environment. A retinal display can be an opaque display or a see-through display, wherein the retinal display projects an image directly into the eye of the viewer.

To enable the viewer to view the two two-dimensional images of each stereo pair such that the images are aligned in a way that the viewer perceives a single image with depth, as in a three dimensional image or a stereoscopic image, the two two-dimensional images must be perceived to be the same size and aligned with one another. Where when the two two-dimensional images are the same size and aligned with each other, objects in the scene are positioned in the viewer's field of view for each eye such that the two two-dimensional images are identical except for differences caused by their respective different perspectives. As a result, the invention provides a method and apparatus for detecting the perceived location of the second image on the remote display within the viewer's field of view for one eye and the location of the first image on the monocular display is adjusted relative to the viewer's field of view for the other eye such that the two images are perceived to be overlaid on top of one another. The invention also provides a method to maintain alignment between the perceived locations of the first and second images as the viewer's head moves. The invention also provides a method for measuring the perceived size of the remote display relative to the viewer's field of view along with a method to maintain the perceived size as the viewer's head moves. Changes in the alignment between the perceived location of the second image on the remote display and the first image on the monocular display are determined by using a camera on the monocular device or by using a head tracking device on the monocular device.

FIG. 1 is a block diagram of the apparatus of the invention including an image delivery system 20, a remote display 10 and a monocular device 30. The remote display 10 includes a second two-dimensional display 14 and display indicators 12. The remote display 10 can be a television, a computer monitor, a cellphone display, a tablet display, a billboard display, a hardcopy image or any other two-dimensional display.

The monocular device 30 includes a first two-dimensional monocular display 40, a transceiver 36, an orientation sensor 34, an image capture device 32 (such as a camera) and a processor 38. The monocular display 40 includes optics to present the image on the monocular display 40 to the viewer in a focused condition. The image delivery system 20 can be connected to the remote display 10 and the monocular device 30 either by a cable or by wireless or a combination thereof. In a preferred embodiment of the invention, the monocular device 30 is connected for two way communication to the image delivery system 20 by wireless through the transceiver 36, wherein wireless includes: radio, Wifi, Bluetooth, infrared or other wireless technologies.

The image delivery system 20 provides stereo video images from an available source such as: a broadcast source, a cable source, a video player (e.g. a DVD player, a CD player, a computer, a digital video player, or other), a live stereo camera, a two-dimensional video that is converted to stereo video by the image delivery system 20 or any other source of stereo video images. The image delivery system 20 provides a first two-dimensional video to the monocular device 30 and a second two-dimensional video to the remote display 10, wherein the first and second two dimensional videos are comprised of synchronized images that together form stereo image pairs that are presented simultaneously to the monocular device 30 and the remote display 10. The stereo image pairs are viewed simultaneously by the viewer with one eye on the second two dimensional display 14 in the remote display 10 and the other eye on the first two-dimensional monocular display 40 in the monocular device 30.

In an alternate embodiment of the invention, the image delivery system 20 provides a first two-dimensional video to the monocular device 30 and a second two-dimensional video to the remote device 10, wherein the first and second two dimensional videos are synchronized to provide stereo image pairs in an alternating fashion to the monocular device 30 and the remote display 10. The stereo image pairs are then viewed in an alternating repeating fashion by the viewer with one eye on the second two dimensional display 14 in the remote display 10 and the other eye on the first two-dimensional monocular display 40 in the monocular device 30.

The transceiver 36 in the monocular device 30, receives two-dimensional video images provided by the image delivery system 20. The processor 38 in the monocular device 30 processes the two-dimensional video images in correspondence to the orientation sensor 34 and the image capture device 32 and provides processed two dimensional video images to the two-dimensional monocular display 40 for display to one eye of the viewer.

The image capture device 32 in the monocular device 30 is used to determine the perceived location and perceived size of the second two-dimensional display 14 in the remote display 10. The location and size of two-dimensional images as presented on the first two-dimensional monocular display 40 in the monocular device 30 is changed in correspondence to changes in the perceived location and perceived size of the second two-dimensional display 14 in the remote display 10. The display indicators 12 provide a marker for the second two dimensional display 14 in the remote display 10 that can be identified in the images captured by the image capture device 32 in the monocular device 30. In a preferred embodiment, the display indicators 12 are LEDs placed at the corners of the second two-dimensional display 14 in the remote display 10. The images captured by the image capture device 32 record the relative locations of the display indicators 12 as bright spots in the images that approximately form a rectangle. By comparing the relative locations of the display indicators 12 in the images, the distance from the monocular device 30 to the remote display 10 can be estimated based on the distance between the display indicators 12. When the shape formed between the display indicators 12 is non-rectangular (also known as a keystone shape), it can be inferred that the viewer is located above, below or to the side of the remote display. Tilt can also be detected from the relative horizontal and vertical lines formed by the display indicators 12 indicating that the viewer's head is tilted.

Based on the relative distance between the display indicators 12 as seen in the captured images from the image capture device 32 and the perceived location, size, shape and tilt of the remote display 10 within the viewer's field of view are determined. The location, size, shape and tilt of the image to be displayed on the monocular device 40 are then determined in correspondence to the perceived location, size, shape and tilt of the image on the remote display 10. Where the image on the monocular display is shifted to compensate for changes in location of the image on the remote display 10. Changes in size are compensated for by resizing the image to be displayed on the monocular display 40. Changes in shape are compensated for by warping the image to be displayed on the monocular display 40. Changes in tilt are compensated for by rotating the imager to be displayed on the monocular display 40.

Shifting, resizing, warping and rotating of digital images is well known in the art, a description of warping the compensate for detected keystone in a projected image can be found in the article: R. Sukthankar, R. G. Stockton, M. D. Mullin, "Smarter Presentations: Exploiting Homography in Camera-Projector Systems", 2001 Proceedings of International Conference on Computer Vision.

Figure 2:
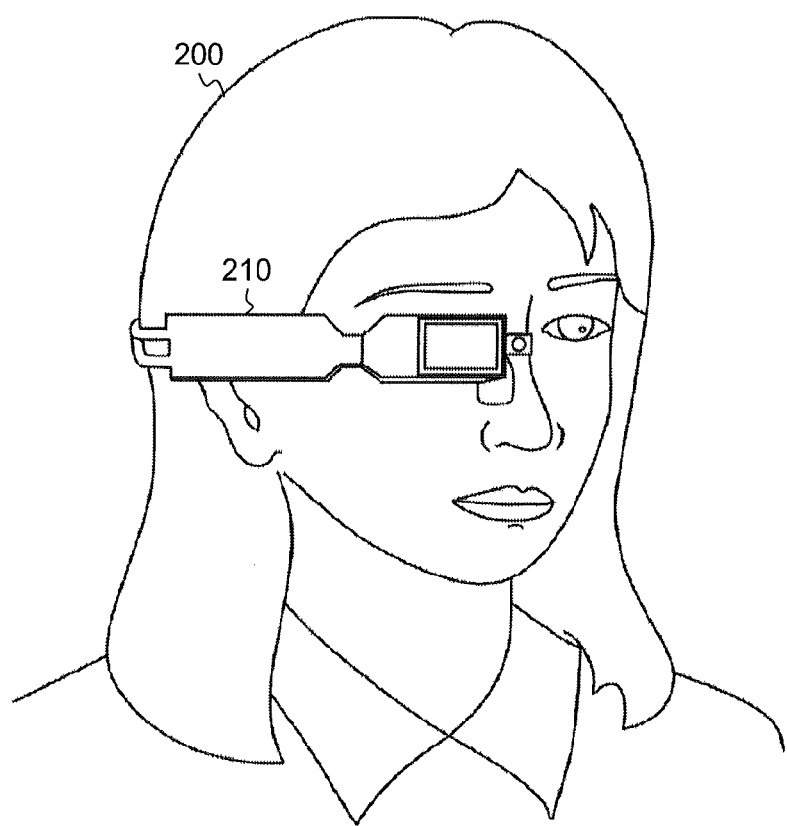
FIG. 2 is an illustration of a monocular display to present an image to one eye of a viewer while the other eye of the viewer is not covered.

FIG. 2 shows a first embodiment of the invention in which a monocular device presents an image to one eye of the viewer while the other eye is uncovered. While FIG. 2 shows a monocular device 210 on the right eye of a viewer 200, the monocular device 210 is shown in a symmetric configuration so that the monocular device 210 can alternately be worn on the left eye. Typically, people have a dominant eye and as a result, viewers will have a preference as to which eye to view the remote display 10 and which eye to view the monocular device 210.

In another embodiment of the invention, the monocular device 30 includes a sensor to detect whether the device is being worn on the right eye or the left eye of the viewer, as for example by using the orientation sensor 34 to determine which side of the monocular device 30 is up.

Figure 3:
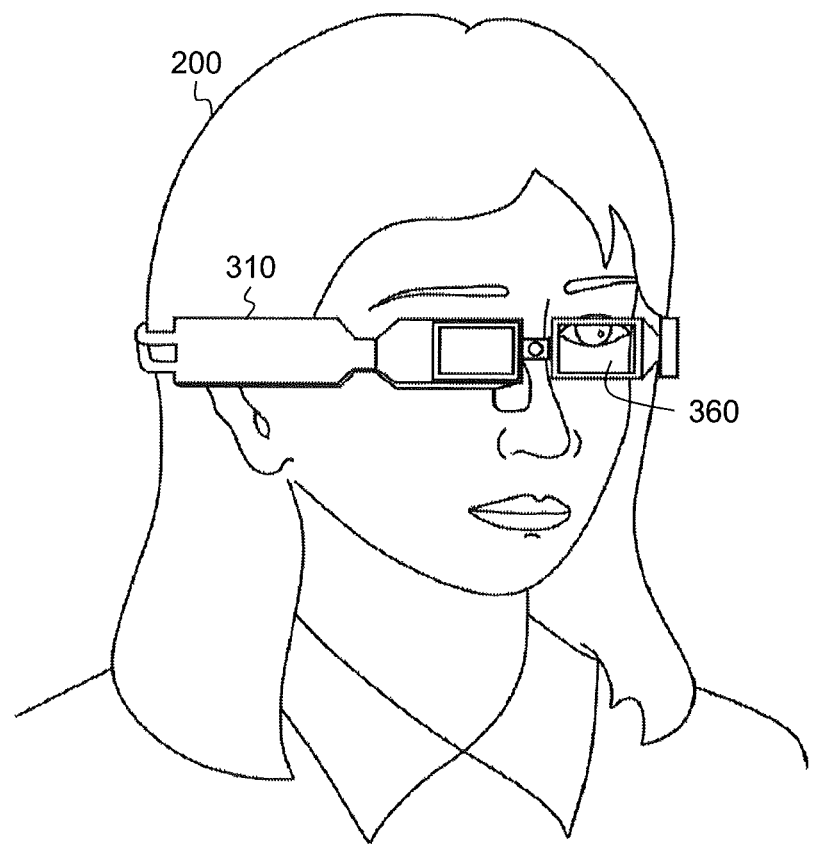
FIG. 3 is an illustration of a monocular display to present an image to one eye of a viewer while the other eye of the viewer is covered with a transparent lens.
Figure 10A:
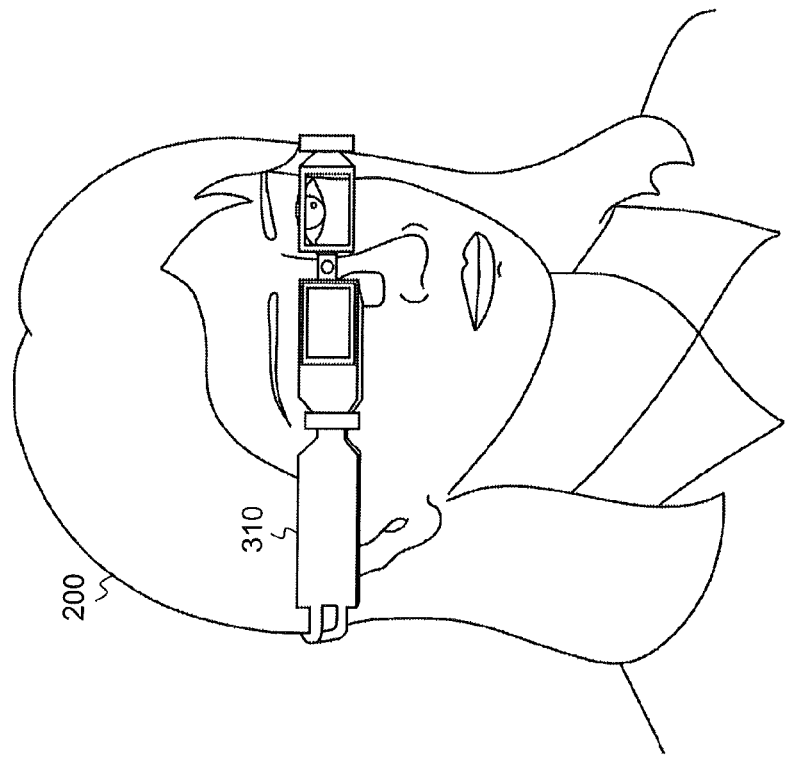
FIGS. 10A and 10B are illustrations of an embodiment of a monocular display which is symmetric for use on either the right or left eye of the viewer.
Figure 10B:
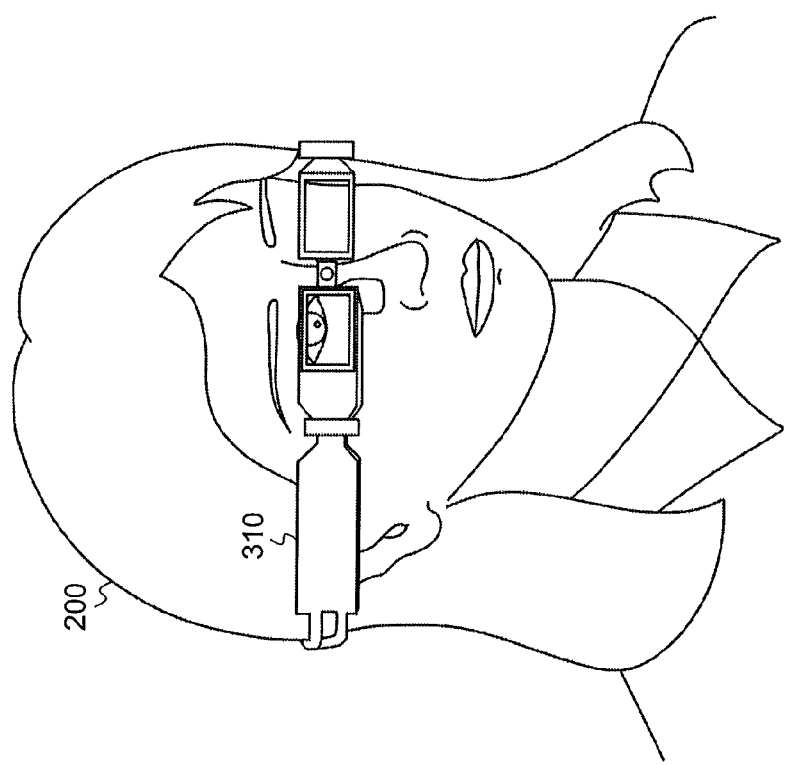

FIG. 3 shows another embodiment of the invention in which a monocular device 310 presents an image to one eye of the viewer 200 while the other eye is covered with a transparent lens 360 so the viewer 200 can see the remote display 10. While FIG. 3 shows the monocular device 310 with the first image presented to the right eye of the viewer, the monocular device 310 is shown in a symmetric configuration so that the monocular device 310 can alternately be worn to present the first image to the left eye, as shown in FIGS. 10A and 10B.

Figure 17A:
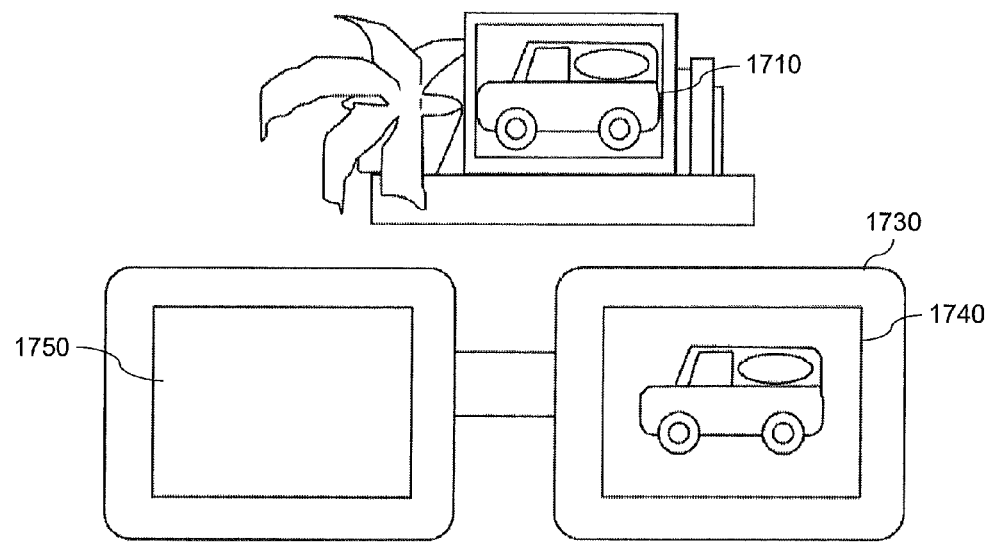
FIGS. 17A, 17B and 17C are illustrations of a monocular display and a remote display showing the relative views from the viewer's perspective.
Figure 17B:
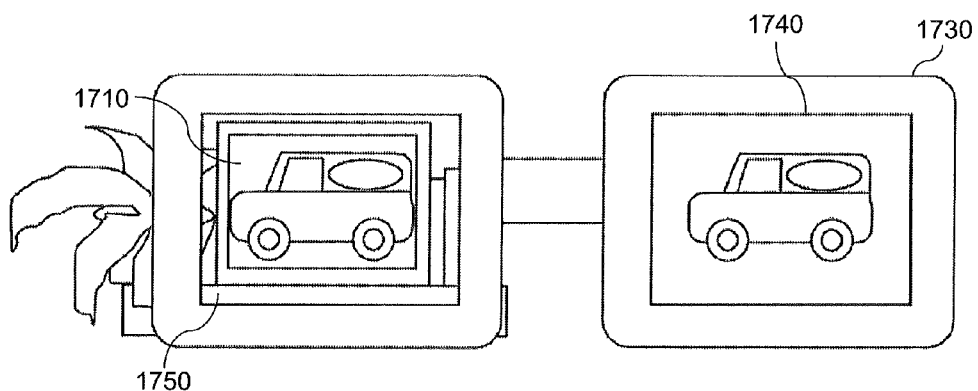

FIG. 17A shows an illustration of a monocular device similar to that shown in FIG. 3 but from slightly behind and above the viewer's perspective. In FIG. 17A, a monocular device 1730 includes a first monocular display 1740 on one eye and a clear lens 1750 on the other eye. A second remote display 1710 is shown as a television that is located at a distance in front of the viewer. The image of a car is shown on both the monocular display 1740 and the remote display 1710 (for a stereo image, the images on the monocular display 1740 and the remote display 1710 would have different perspectives so that they form a stereo image pair). FIG. 17B shows an illustration of the same monocular device 1730 as that shown in FIG. 17A but from slightly behind the viewer's perspective so that the two views of the car image are shown as perceived by the viewer as being the same size and in the same relative location within the field of view of the viewer's eyes. Further in FIG. 17B, in addition to the car image, the viewer views a portion of the environment that is adjacent to the remote display 1710 when looking through a transparent lens 1750.

Figure 4:
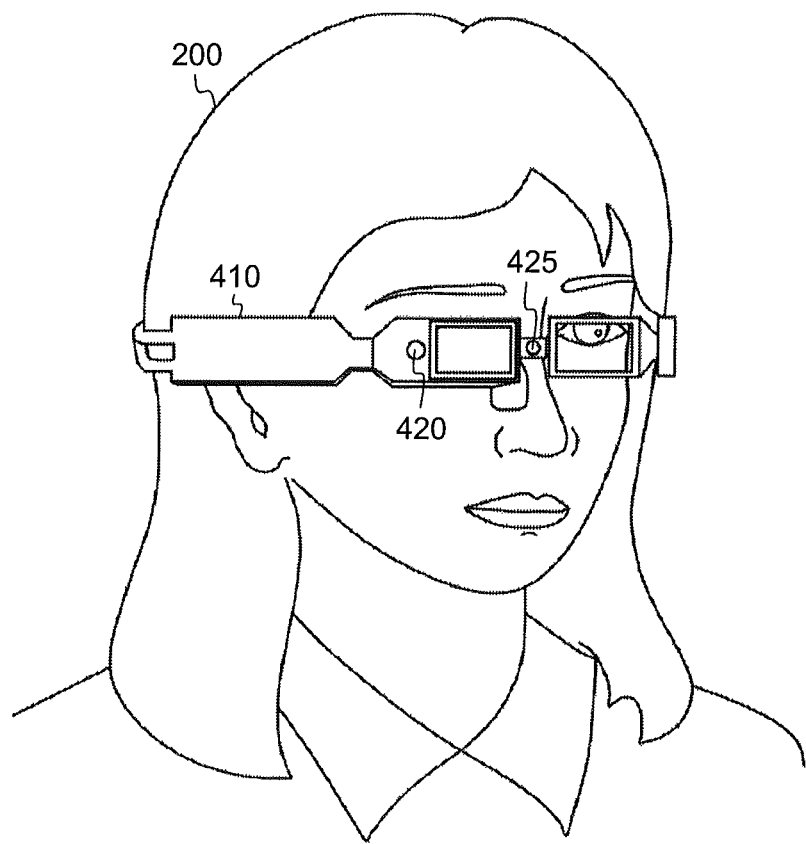
FIG. 4 is an illustration of a monocular display similar to FIG. 3 but with an additional light source.
Figure 5:
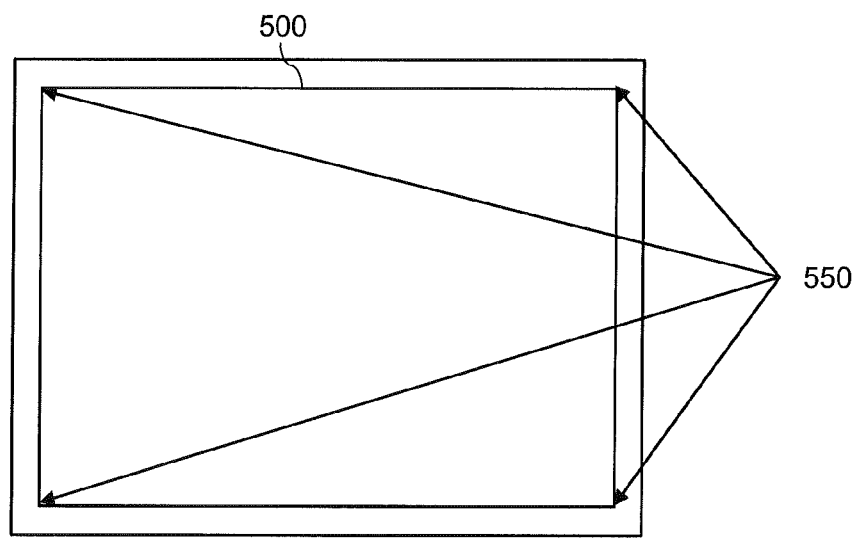
FIG. 5 is an illustration of a display.

FIG. 4 shows an illustration of a monocular device 410 with an image capture device 420 in an embodiment of the invention. The image capture device 420 is shown located to one side of the monocular device 410, but other location s are also possible such as for example the image capture device 425. The image capture device 420 is used to detect the perceived size and location of the remote display 10 relative to the viewer's field of view. For a remote display 500 as shown in FIG. 5, the perceived size and location of the remote display 500 are detected by capturing images of the remote display 500 with the image capture device 420 on the monocular device 410 and analyzing the images to determine the locations of the display indicators 12 which for the embodiment shown in FIG. 5 are corners 550 of the display surface on the remote display 500. By determining the locations of all four corners 550 of the display surface of the remote display 500, differences in the perceived lengths of the sides of the remote display 500, due to distortion or keystone, can be used to determine whether the viewer 200 is located directly in front of the remote display 500 or towards the side or above or below the remote display 500. If distortion or keystone is detected in the images of the remote display 500, the image presented on the monocular device 410 is adjusted to provide the same degree of distortion or keystone as is perceived in the images of the remote display 500.

For the purpose of determining the locations of the corners 550 and perceived size of the remote display 500, the data is provided in terms of pixel locations in the images captured of the remote display 500 by the image capture device 420 or by determining the angular locations of the locations of the corners 550 in the field of view of the image capture device 420.

Figure 14:
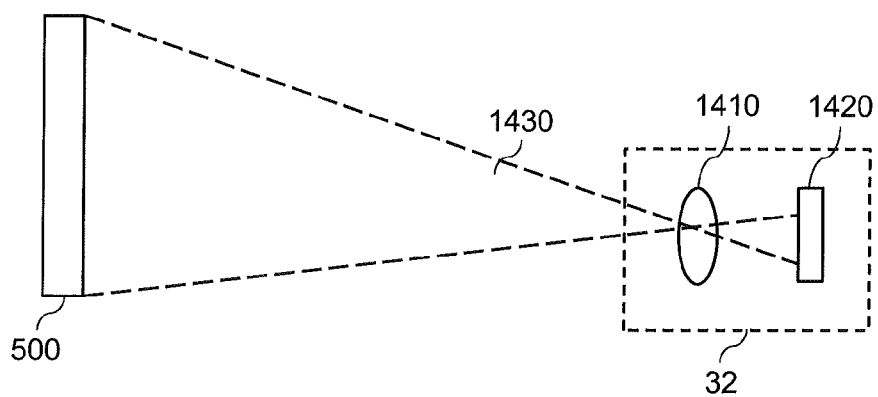
FIG. 14 is an illustration of an image capture device and the portion of the field of view associated with the remote display.

FIG. 14 shows an illustration of the image capture device 32 including a lens assembly 1410 and an image sensor 1420. Wherein, the remote display 500 occupies a portion 1430 of the field of view of the image capture device 32. The perceived locations of the corners 550 of the remote display 500 are then provided as pixel locations on the image sensor 1420 or as pixel locations in the associated captured images of the remote display 500 provided by the image capture device 32. To track movements of the viewer 200 relative to the remote display 500, the image capture device 420 captures images repeatedly thereby providing a video record of the corner 550 locations and perceived size of the remote display 500 as the viewer moves.

Figure 13:
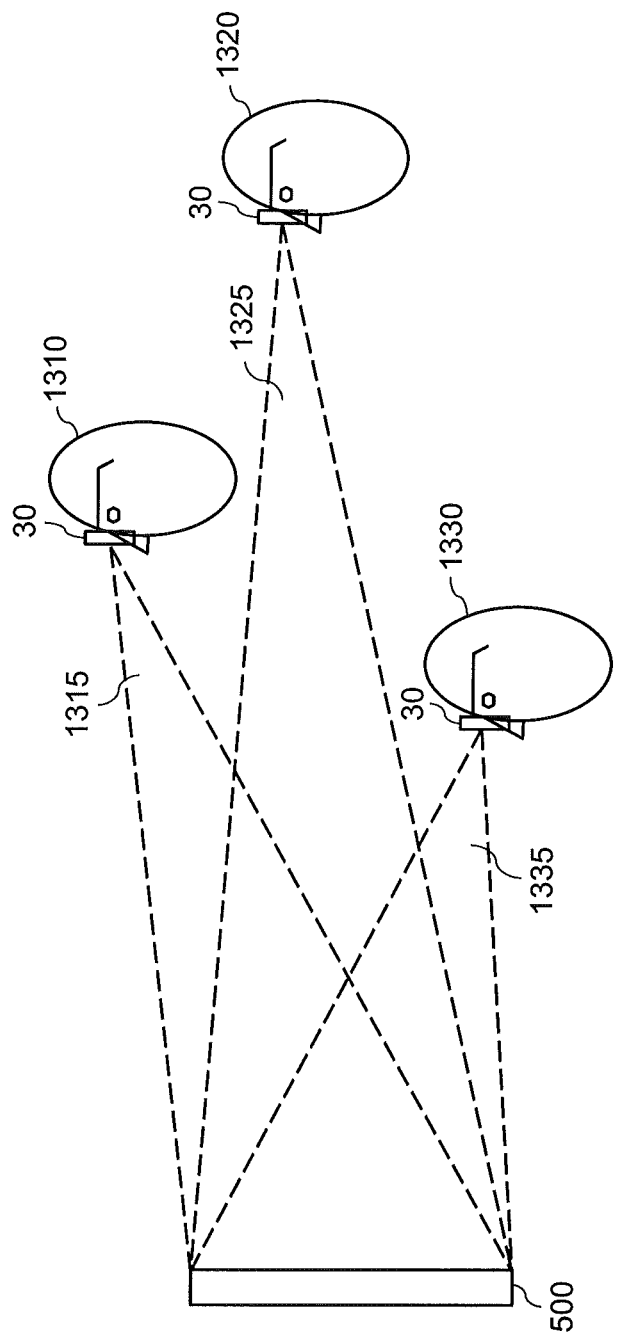
FIG. 13 is an illustration of multiple viewers simultaneously watching stereo video using monocular devices with a single remote display in an embodiment of the invention.

FIG. 13 shows an illustration of three viewers 1310, 1320 and 1330 watching the remote display 500 while each wearing monocular devices 30. The differences in the perceived locations of the remote display 500 as seen by the three viewers 1310, 1320 and 1330 can be seen by comparing the relative portions 1315, 1325 and 1335 of their respective fields of view occupied by the remote display 500. The viewers 1310, 1320 and 1330 are shown watching stereo video simultaneously from different locations by each using a monocular device 30 and a single remote display 500. In addition, the invention enables any number of other viewers to simultaneously watch two-dimensional video on the remote display 500 by not using a monocular device 30.

In order to provide for improved operation of the monocular device 30, in another embodiment of the invention, the optics for both the monocular display 40 and the lens assembly 1410 for the image capture device 32 are set to the same focus distance. In another embodiment, focus mechanisms are provided for the optics for both the monocular display 40 and the lens assembly 1410 for the image capture device 32, wherein the focus mechanisms can be manually adjustable or automatic to accommodate a wide range of viewing distances between a viewer 1310, 1320 or 1330 and the remote display 500 as shown in FIG. 13. Alternately, in a preferred embodiment, the optics for the monocular display 40 along with the lens 1410 for the image capture device 32 are both set to focus at the hyperfocal distance infinity to provide the easiest viewing and the largest focus range possible.

Figure 6:
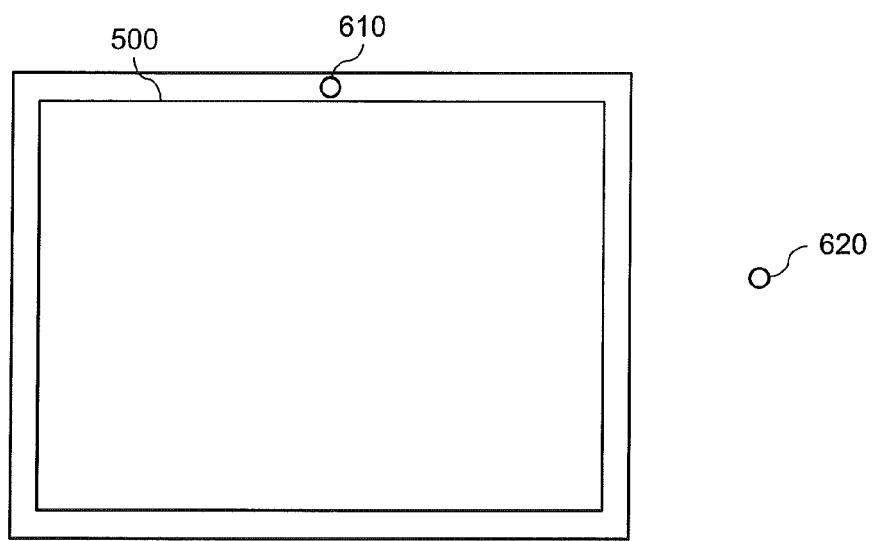
FIG. 6 is an illustration of a display with a point source.

FIG. 6 shows an illustration of remote display 500 with the display indicator 12 that is a point source light 610 next to the display area in another embodiment of the invention. The addition of the point source light 610 makes it easier to determine the location of the remote display 500 from images captured by the image capture device 420 due to the high contrast between the point source light and the environment surrounding the remote display 500. The point source light 610 can be a white light, a colored light, an infrared light or an ultraviolet light. An infrared or ultraviolet light is preferred for the point source light 610 since infrared and ultraviolet light are not visible to the user and thereby does not degrade the viewing experience when looking at the remote display 500. The image capture device 420 on the monocular device 410 must be selected in concert with the point source light 610 on the remote display 500 so that the wavelength of light provided by the point source light 610 is detectable by the image capture device 420.

Figure 7:
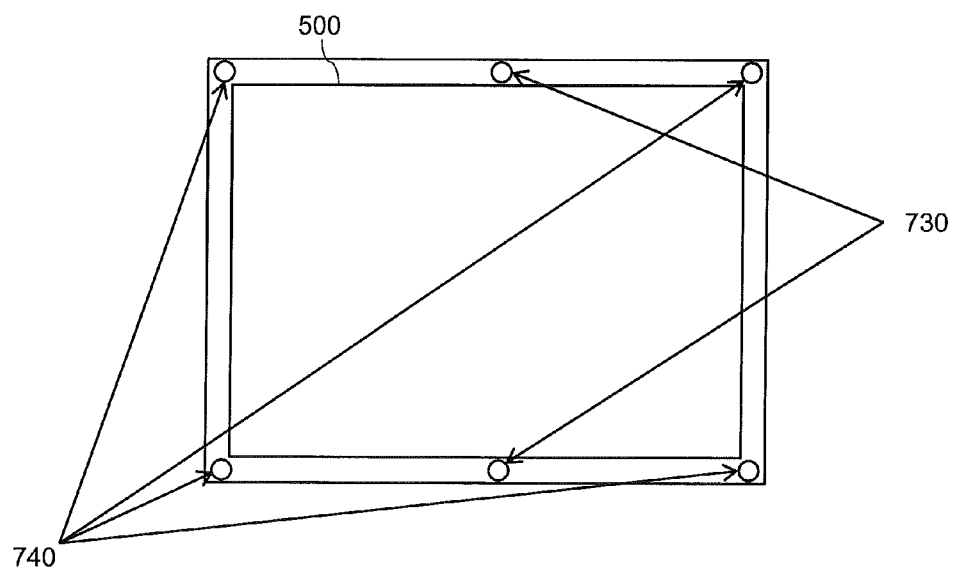
FIG. 7 is an illustration of a display with two point sources.

In a further embodiment of the invention, a second point source light 620 is positioned adjacent to the remote display as the display indicator 12 as shown in FIG. 6. FIG. 7 shows an alternate embodiment of point source lights 730. By providing two point source lights 730 adjacent to the remote display 500 as shown in FIG. 7, the perceived size of the remote display 500 can be determined directly by detecting the perceived spacing between the point source lights 730. In yet another embodiment of the invention, the display indicators 12 are four point source lights 740 located at the corners of the remote display 500 so that the perceived locations of the four corners of the remote display 500 can be determined directly by detecting the locations of the point source lights 730 in images captured by the image capture device 420. In addition, the point source lights 730 can be detected along with the corners 550 of the display surface of the remote display 500. By detecting the locations of the four corners of the display surface of the remote display 500, distortion or keystone can also be detected as caused by the viewer sitting to one side or above or below the remote display 500 as mentioned previously.

Figure 8:
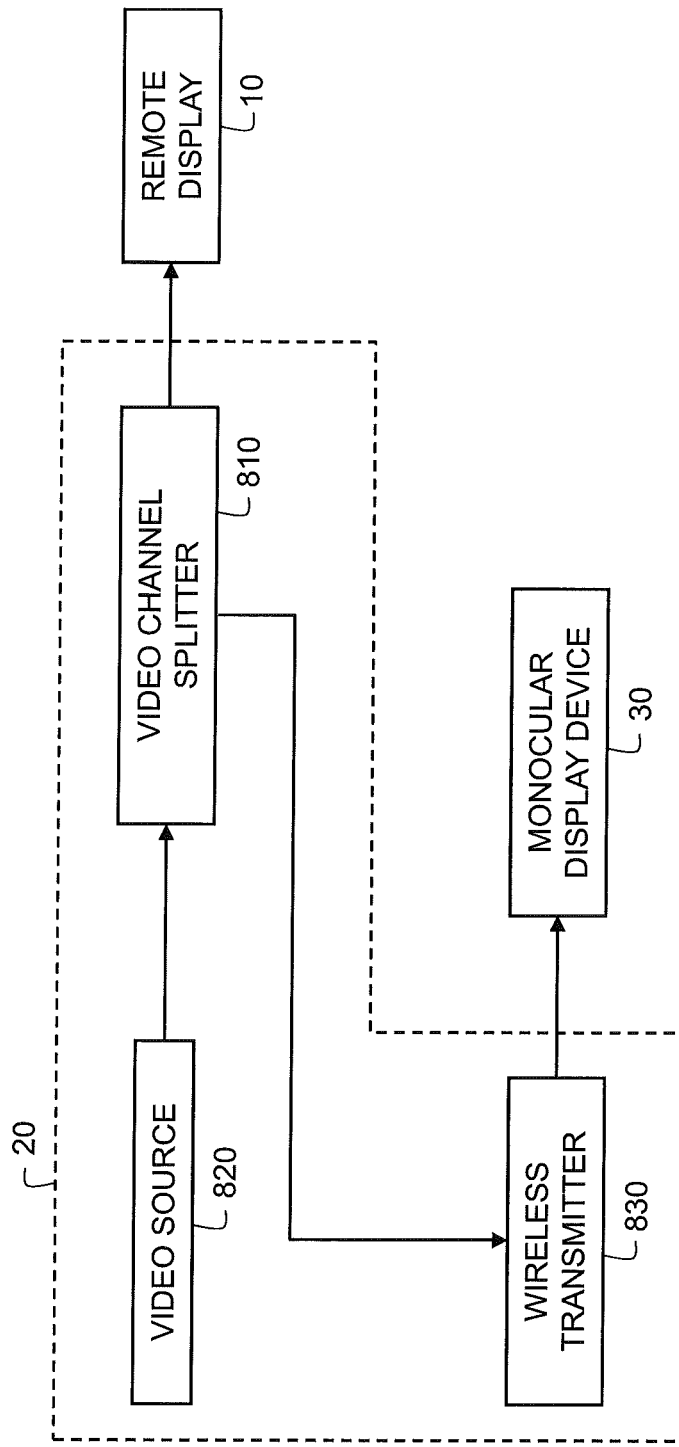
FIG. 8 is a block diagram of an embodiment of the stereo video system.

FIG. 8 shows a block diagram of the image delivery system 20 in an embodiment of the invention. A stereo video is provided by a video source 820 as a series of synchronized sequential stereo image pairs. A video channel splitter 810 then separates the stereo image pairs into left and right sequential video images for synchronized display on the remote display 10 and the monocular device 30. The video images for the monocular device 30 are then sent to a wireless transmitter 830 for transmitting to the transceiver 36 that is part of the monocular device 30 as shown in FIG. 1. It is important to note that because the viewer perceives the stereo image as a combination of the image from the remote display 10 and the image from the monocular display 30, the characteristics of the images do not have to be the same. The resolution, tone scale, color gamut, contrast, dynamic range or bit depth of the images provided to the remote display 10 can be quite different from the images provided to the monocular device 30. For example, the video images provided for the monocular device 30 can be of a reduced resolution compared to the video images provided for the remote display 10 to reduce the bandwidth required by both the video source 820 and the wireless transmitter 830.

Figure 9:
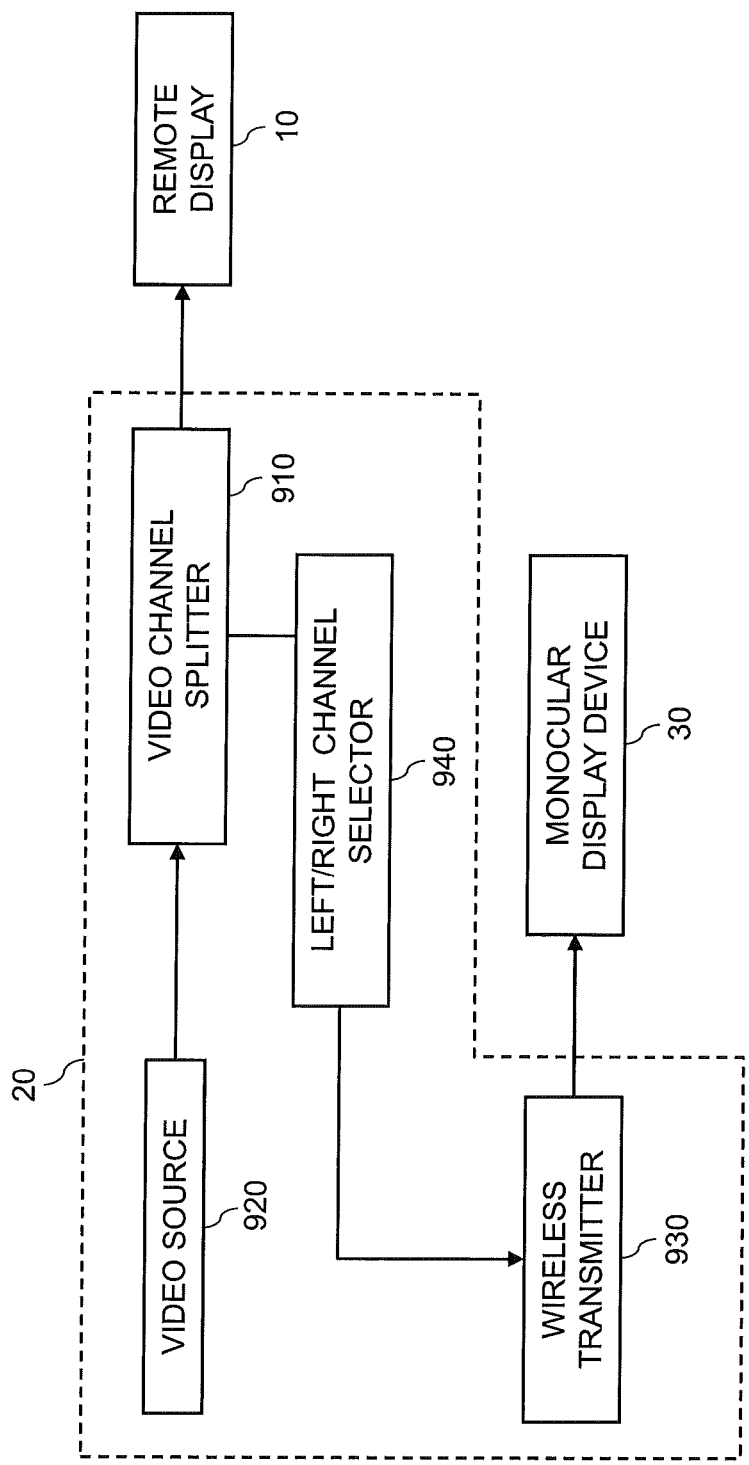
FIG. 9 is a block diagram of another embodiment of the stereo video system.

FIG. 9 shows a block diagram of another embodiment of the image delivery system 20 that permits changes in the presentation of stereo images based on whether the viewer's dominant eye is the left eye or the right eye. In this embodiment of the invention, the video source 920 provides a three channel video with video images provided as synchronized sequential stereo triplets where each stereo triplet is comprised of three images of the same scene but with different perspectives: a center image, a left image and a right image. A video channel splitter 910 then splits the stereo triplets into a center video, a left video and a right video. The center video is preferably transmitted to the remote display 10 for display. Depending on the orientation of the monocular device 30 on either the left eye or the right eye of the viewer, a left/right channel selector 940 sends either the left video or the right video to a wireless transmitter 930 for transmission to the transceiver 36 in the monocular device 30. The selected left or right video is then displayed on the monocular device 30 in a synchronized manner with the center video on the remote display 10 so that the viewer perceives stereo video. The viewer can then select which eye to view the remote display 10 and which eye to view the monocular display 40 of the monocular device 30 based on their preference or which eye is dominant. For the case as shown in FIG. 13 where multiple viewers wearing monocular devices 30 are viewing stereoscopic images at the same time, some viewers can be using the monocular device 30 with the monocular display 40 on the left eye while other viewers are using the monocular device 30 with the monocular display 40 on the right eye. In this case, the wireless transmitter 930 transmits the left video to those viewers with the monocular device 30 positioned with the monocular display 40 on the left eye while also transmitting the right video to those viewers that have the monocular device 30 positioned with the monocular display 40 on the right eye.

When the monocular display device 30 can be used on either right or the left eye of the viewer as shown in FIGS. 10A and 10B, the orientation sensor 34 (as shown in FIG. 1) is used to sense which side of the monocular device 30 is up and as a result, the eye the viewer is using the monocular device 30 on is determined and the information sent to the left/right channel selector 940 and the wireless transmitter 930. The orientation sensor 34 is also used to determine which way is up for the presentation of the image on the monocular display 40.

As previously discussed, the characteristics of the synchronized images in the stereo triplets can be different. In a further embodiment of the invention, the synchronized sequential stereo triplets include a higher resolution center image and reduced resolution left and right images. By providing reduced resolution left and right images, the bandwidth required by the video source 920 is reduced for the stereo triplets. The bandwidth required for the wireless transmitter 930 is also reduced for providing the left video or right video to the transceiver 36 in the monocular device 30. In an embodiment of the invention, the resolution of the left and right images is reduced to less than one half that of the center images so that the bandwidth required for the stereo triplets is less than that required for homogenous stereo image pairs where the images in the stereo image pairs both have the same resolution as the center images in the stereo triplets. In a preferred embodiment of the invention, the resolution of the left and right images in the stereo triplets is one quarter or less compared to the resolution of the center images. In a further preferred embodiment of the invention, the bit depth of the left and right images in the stereo triplet is reduced to less than one half that of the bit depth of the center images.

Figure 11:
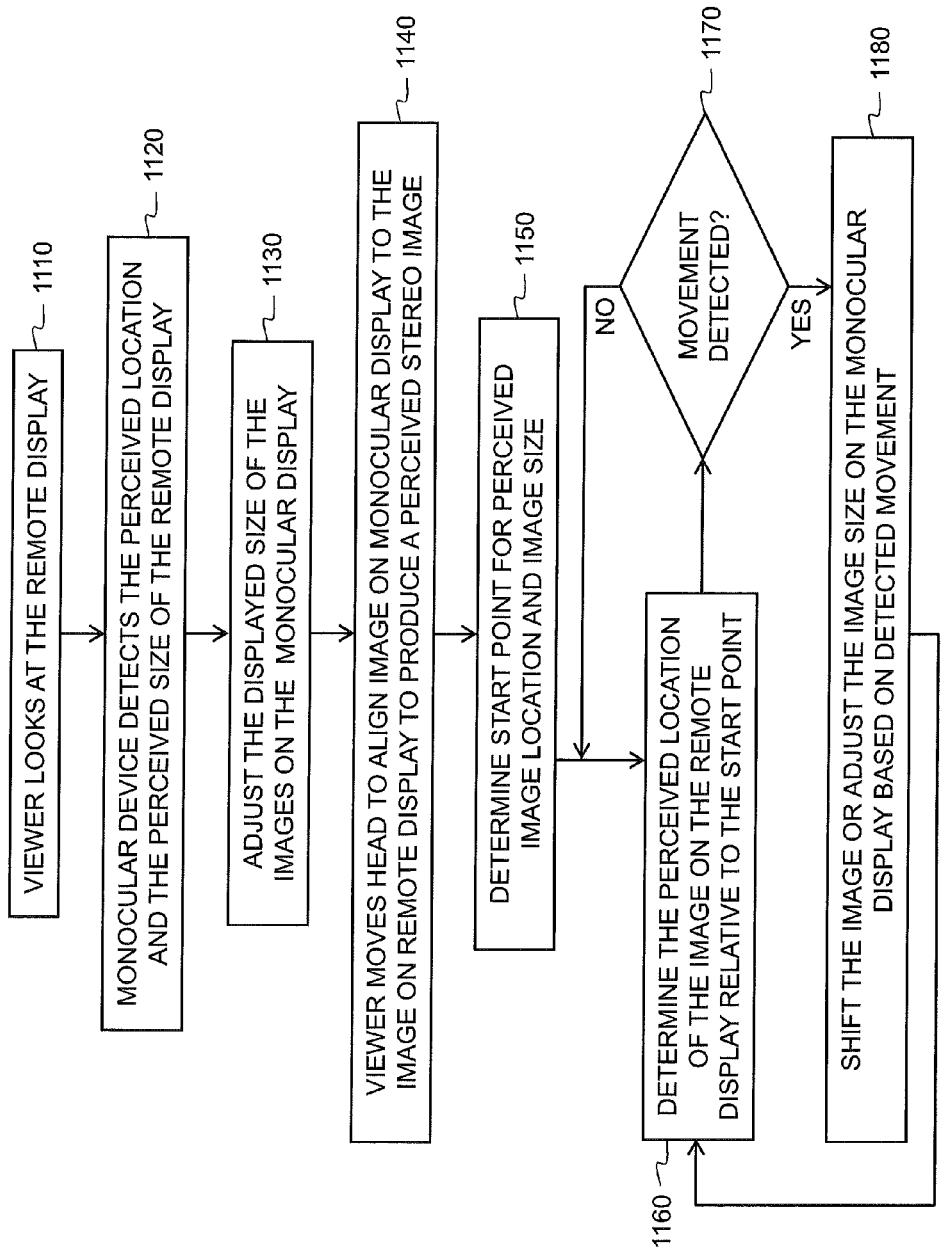
FIG. 11 is a flow chart for a method of adjusting and aligning the image in the monocular display.

FIG. 11 shows a flow chart of an embodiment of the method of the invention. In Step 1110, the viewer looks at the remote display 10. In Step 1120, the image capture device 32 in the monocular device 30 captures images of the remote display 10 and the associated display indicators 12. For the case where the display indicators are the corners 550 of the display area 500 as shown in FIG. 5, the remote display 10 is detected as a bright rectangular object in approximately the center of the captured image. The perceived locations of the corners 550 of the remote display 10 and the perceived size of the remote display 10 are then determined by the processor 38 by analyzing the captured images. The displayed size of the images on the monocular display 40 is then changed in Step 1130 so the portion of the viewer's field of view occupied by the images on the monocular display 40 is approximately the same as the portion of the viewer's field of view occupied by the images on the remote display 10. The relationship between the perceived field of view for the remote display 10 and the perceived field of view for the monocular display 40 can be determined by calibration or through a setup procedure executed by the viewer in Step 1130 where the perceived size of the image on the monocular display 40 is adjusted to match the perceived size of the image on the remote display 10. In Step 1140, the viewer moves their head to visually align the image on the monocular display 40 to the image on the remote display 10 so that the viewer perceives a stereo image. When the viewer stops moving their head, a start point for image location and image size is determined in Step 1150. In Step 1160, the perceived location of the image on the remote display 10 is determined by determining the location of the display indicators 12 in images captured by the image capture device 32 and analyzed by the processor 38. In Step 1170, the current perceived location of the display indicators 12 is compared to the start point or the previous location to determine movement of the viewer's head. If movement is detected in Step 1170, the image on the monocular display is shifted or the image size is adjusted in Step 1180 to maintain the perceived alignment and size of the image on the monocular display relative to the perceived location and size of the remote display 10 and the process returns to Step 1160. If movement is not detected in Step 1170, the location of the image on the monocular display 40 is measured again in Step 1160. The process loop including Steps 1160, 1170 and 1180 is repeated at a rapid rate, preferably at video frame rates corresponding to 30 times per second or faster.

In another embodiment of the invention, a calibration target image is displayed on the remote display 10 or the monocular display 40 during steps 1110, 1120, 1130, 1140 and 1150. After the start point is determined in Step 1150, the calibration test image is discontinued and the stereo image desired for viewing by the viewer is presented on the remote display 10 and the monocular display 40. The process then continues with the stereo image for viewing in Steps 1160, 1170 and 1180.

In yet another embodiment of the invention, the orientation sensor 34 includes a head tracker device such as accelerometers or gyros to measure rapid movements of the viewer's head. The start point determined in Steps 1150 then includes a head tracker measurement of the starting location of the viewer's head. Movements of the viewer's head are then determined in Steps 1160 by a combination of measurements of the orientation sensor 34 and by analysis of images captured by the image capture device 32 to determine the locations of the display indicators 12 associated with the remote display 10. Rapid movements of the viewer's head can be easily tracked relative to the starting point by the head tracker in the orientation sensor 34 while slower movements can be tracked by analysis of images captured by the image capture device 32.

Figure 12:
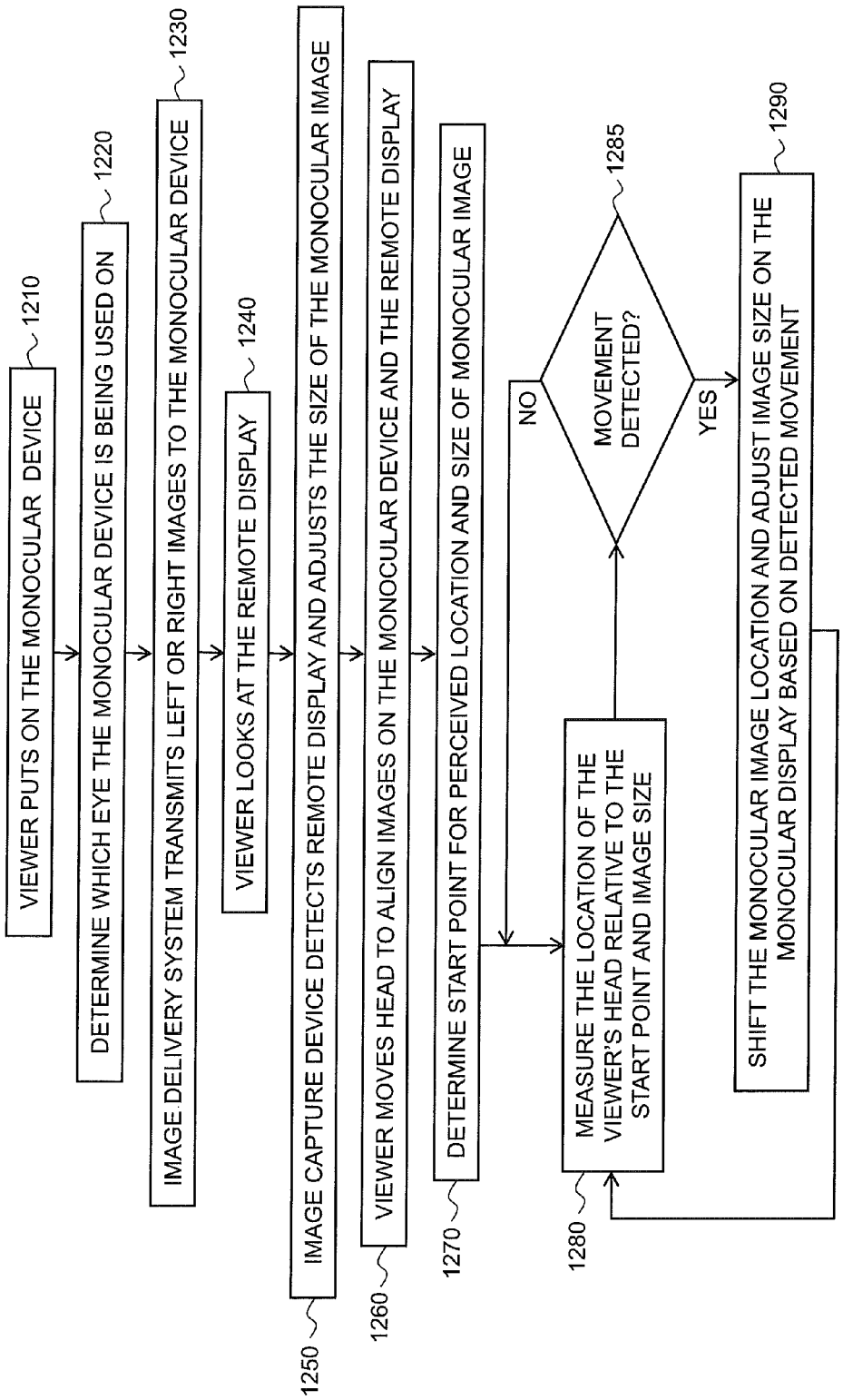
FIG. 12 is a flowchart for another method of adjusting and aligning the image in the monocular display.

FIG. 12 shows a flow chart of a further embodiment of the invention using a monocular device 30 that is symmetric and can be worn on either the right or left eye as shown in FIGS. 10A and 10B. In Step 1210, the viewer puts on the monocular device 30. In Step 1220, the monocular device 30 determines whether the device is being worn with the monocular display 40 on the right eye or the left eye of the viewer, for example, by the orientation sensor 34 determining which side of the device is up. The monocular device 30 communicates the determined eye that the monocular display 40 is worn on to the image delivery system 20. In Step 1230, the image delivery system 20 transmits the appropriate left or right images to the monocular device 30. The viewer then looks at the remote display 10 in Step 1240. The image capture device 32 and processor 38 detect the remote display 10 and the associated display indictors 12 in Step 1250 and adjust the size of the image on the monocular display 40 so that the size of the image on the monocular display 40 as perceived by the viewer, is the same as the perceived size of the image on the remote display 10. In Step 1260, the viewer moves their head to align the image on the monocular display 40 with the image on the remote display 10. When the viewer stops moving their head, a start point is detected in Step 1270 and the location of the viewer's head is stored along with the displayed size of the image on the monocular display 40. The location of the viewer's head is measured by analysis of images captured by the image capture device 32 or by the orientation device 34 which includes inertial measurement devices such as accelerometers, gyros or magnetometers. In Step 1280, the location of the viewer's head is measured relative to the start point or relative to the last measured location of the viewer's head. The perceived size of the remote display 10 is also detected in Step 1280 by capturing an image of the remote display 10 with the image capture device 32 and analyzing the image to detect the associated display indicators 12. In Step 1285, the location of the viewer's head and the perceived size of the remote display 10 are compared to the start point or to the last measured location of the viewer's head. If a movement of the viewer's head is detected or if a change in the perceived size of the remote display 10 is detected in Step 1285, in Step 1290, the location of the image on the monocular display 40 is shifted or the size of the image displayed on the monocular display 40 is changed respectively in a direction and magnitude that corresponds to the detected movement or the size of the displayed image is changed by an amount that corresponds to the change in the perceived size of the remote display 10. The process then returns to Step 1280. If no movement is detected and no change in perceived size is detected in Step 1285 then the process loops back to Step 1280 and the location of the viewer's head is measured again and the perceived size of the remote display is detected again.

Figure 15:
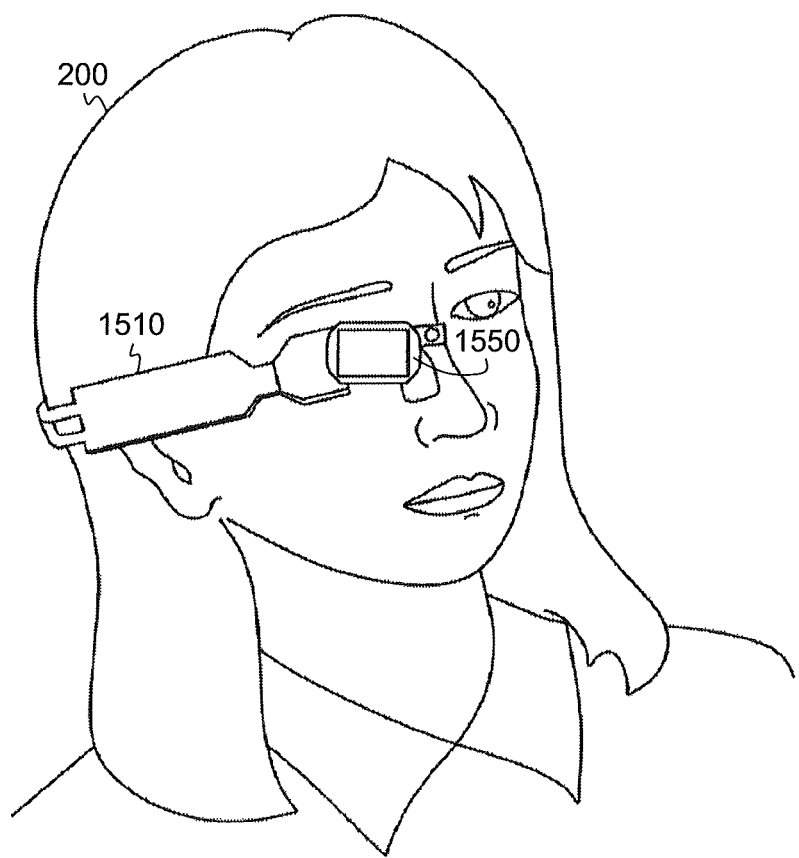
FIG. 15 is an illustration of a monocular display which can rotate to align the image on the monocular display when the viewer tilts their head relative to the remote display.
Figure 16A:
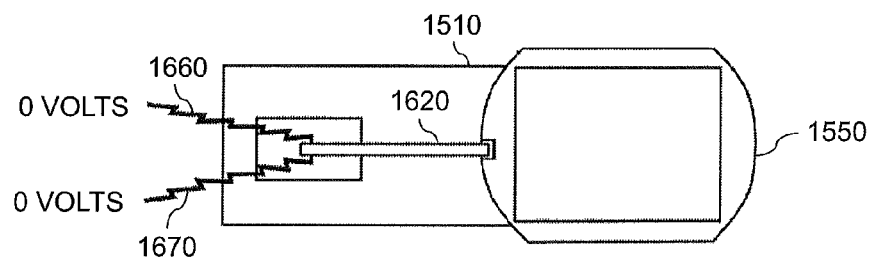
FIGS. 16A and 16B are illustrations of a cross sectional view of a monocular display showing a mechanism for rotating the display in response to the viewer tilting their head relative to the remote display.
Figure 16B:
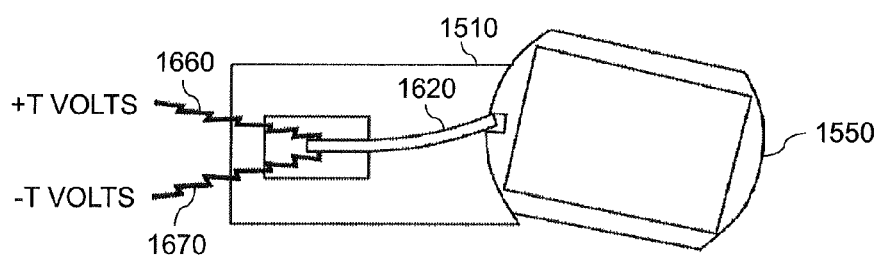

During normal movement of the viewer's head while simultaneously viewing images on the monocular device 30 and the remote display 10, adjustments in the location of the image on the monocular display 40 on the monocular device 30 will need to be made to maintain alignment of the relative position of the first image on the monocular display 40 and the second image on the two dimensional display 14. Typical movements of the viewer and the viewer's head will take the form of lateral and longitudinal shifts (such as for example x and y shifts) as well as rotational shifts relative to the remote display. Lateral and longitudinal shifts can be easily accomplished by digital processing to shift the first image on the monocular display 40, this type of digital processing is well known in the art for image stabilization of video images such as is described in U.S. Pat. No. 7,755,667. Rotational shifts can be accomplished through digital processing of the image, however, the digital processing associated with rotational shifts of an image are complex and computationally intensive. In a yet further embodiment of the invention, a mechanical rotating mechanism is provided to rotate the monocular display 40. The mechanical rotating mechanism includes an electric actuator device that is controlled by a controller in response to determined rotational misalignments between the first image on the monocular display 40 and the second image on the remote display 10. FIG. 15 shows an illustration of the viewer 200 with a monocular device 1510 in which the display 1550 mechanically rotates as the viewer 200 tilts their head relative to the remote display. The electric actuator device can be any electrically controlled actuator including: electric motors, piezoelectric actuators, thermoelectric actuators, electroactive polymer actuators or electromagnetic actuators. FIGS. 16A and 16B show illustrations of a cross sectional view of a monocular device 1510 with a rotating display 1550 that is caused to rotate on a pivot (not shown) by a piezoelectric bender mechanism 1620. The piezoelectric bender 1620 bends in correspondence to an applied voltage differential on electrodes 1660 and 1670. In FIG. 16A, zero volts are applied to both electrodes 1660 and 1670, since there is no voltage differential, the piezoelectric bender 1620 is straight and the display 1550 is aligned with the device 1510. In contrast, in FIG. 16B, voltages of +T and −T are applied to electrodes 1660 and 1670 respectively and as a result, the display 1550 is rotated clockwise relative to the device 1510. If the voltages applied to the electrodes 1660 and 1670 are reversed, the piezoelectric bender bends in the opposite direction and the display 1550 rotates in the counterclockwise direction (not shown). In this way, digital processing is used to provide rapid lateral and longitudinal shifts of the image on the display 1550 in response to detected lateral and longitudinal misalignments as the viewer 200 moves their head laterally or longitudinally. The piezoelectric bender 1620 rotates the display 1550 in response to detected rotational misalignments.

Figure 17C:
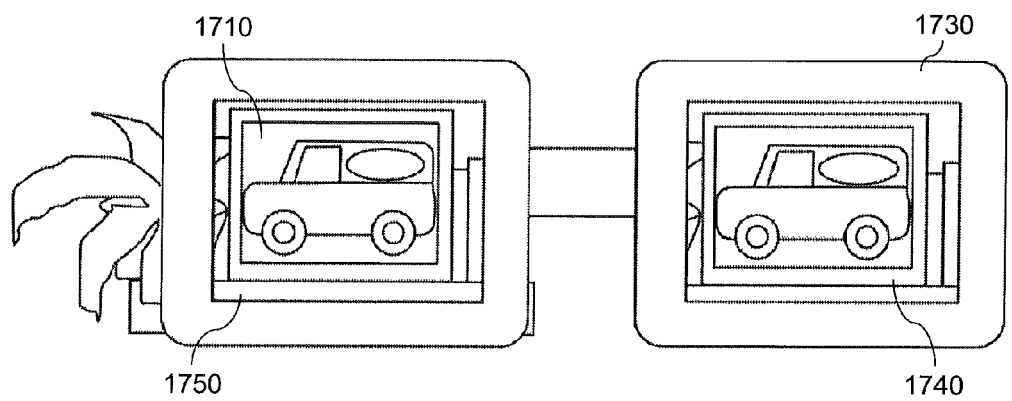

A further embodiment of the present invention is shown in FIG. 17C wherein the image capture device 32 is used to capture images of the remote display 1710 along with images of a portion of the environment adjacent to the remote display 1710. The outer portions of the captured images that are images of the environment adjacent to the remote display are then combined with the images to be displayed on then monocular display 1740 in the form of combination images as shown in FIG. 17C on the monocular device 1730. In this way, the image displayed on the monocular display 1740 looks similar to the image viewed by the viewer through the transparent lens 1750 as seen in FIG. 17C. By presenting images that include portions of the environment to both eyes of the viewer, the viewing experience is improved and tendencies to experience motion sickness or cyber sickness are reduced.

The invention has been described in detail with particular reference to certain preferred embodiments thereof, but it will be understood that variations and modifications can be effected within the spirit and scope of the invention.

PARTS LIST 10 remote display
12 display indicators
14 two dimensional display
20 image delivery system 30 monocular device
32 image capture device
34 orientation sensor
36 transceiver
38 processor
40 monocular display
200 viewer
210 monocular device
310 monocular device
360 transparent lens
410 monocular device
420 image capture device
425 image capture device
500 remote display
550 display area corners
610 point source light
620 point source light
730 point source lights
740 point source lights
810 video channel splitter
820 video source
830 wireless transmitter
910 video channel splitter
920 video source
930 wireless transmitter
940 left/right channel selector
1110 viewer look step
1120 detect remote display step
1130 adjust image size step
1140 viewer align images step
1150 determine start step
1160 determine the perceived location of the remote display step
1170 movement detection step
1180 shift or adjust the image size on the monocular device step
1210 put on the monocular device step
1220 determine left or right eye use step
1230 deliver left or right images step
1240 look at the remote display step
1250 detect the remote display and adjust image size step
1260 viewer moves head to align images step
1270 determine start point step
1280 measure location of viewer's head relative to start point step
1285 movement detection step
1290 shift the image or adjust the image size step
1310 viewer with monocular device
1315 viewer's field of view of the remote display
1320 viewer with monocular device
1325 viewer's field of view of the remote display
1330 viewer with monocular device
1335 viewer's field of view of the remote display
1410 lens assembly
1420 image sensor
1430 field of view for the image capture device
1510 monocular device
1550 mechanically rotating display
1620 piezoelectric bending actuator
1660 electrode
1670 electrode
1710 remote display
1730 monocular device
1740 monocular display
1750 transparent lens

The invention claimed is:

1. A system for viewing images of a scene on first and second displays, comprising:
 a) an image delivery system for providing first and second two dimensional images of the scene wherein the first and second images have different perspectives of the scene;
 b) a monocular device wearable by a viewer comprising the first display for displaying the first two-dimensional images of the scene to one eye of the viewer and
 a camera for capturing images of the second display along with images of a portion of an environment surrounding the second display, wherein the first two dimensional images displayed on the first display are combinations of the first two dimensional images of the scene and images of the portion of the environment surrounding the second display captured by the camera; and
 c) the second display, located remotely to the first display, for displaying the second two-dimensional images of the scene to the other eye of the viewer, such that the viewer perceives three dimensional images of the scene, while another viewer of the second display that is not wearing a monocular device views two-dimensional images of the scene.

2. The system of claim 1 wherein the image delivery system is adapted to further provide synchronized first and second two-dimensional images with first and second different perspectives to the monocular device and the second display respectively.

3. The system of claim 1 wherein the second display is a television, a cell phone display, a computer monitor, or a head mounted display.

4. The system of claim 1 wherein the image delivery system further includes a wireless communication system between the image delivery system and the monocular device to provide the first two-dimensional images to the monocular device.

5. The system of claim 2 wherein the image delivery system is adapted to further provide a series of synchronized sequential first and second two-dimensional images to the monocular device and the second display.

6. The system of claim 4 wherein the wireless image delivery system is a radio system, a wifi system, a bluetooth system or an infrared system.

7. The system of claim 1 wherein the first display is an opaque display.

8. The system of claim 1 wherein the first display is a see-through display.

9. A method for viewing images of a scene on a first and second displays comprising:
 (a) providing a viewer with a monocular device including the first display and a camera;
 (b) using the camera to capture images of the second display along with images of a portion of an environment surrounding the second display;
 (c) using a processor to produce combination images comprised of first two-dimensional images of the scene along with images of the portion of the environment surrounding the second display captured by the camera;
 (d) displaying the combination images on the first display to provide a first perspective of the scene to one eye of the viewer; and
 (e) providing a second display, that is remote from the first display, for viewing with the other eye second two-dimensional images having a second perspective of the scene, wherein the second perspective is different from the first perspective so that the viewer perceives three dimensional images of the scene, while one or more other viewers, not wearing monocular devices, can simultaneously view the second display with both eyes and see two-dimensional images of the scene.

10. The method of claim 9 wherein the second display is a television, a cell phone display, a computer monitor, a tablet display, a billboard display, a hardcopy image or any other two-dimensional display.

11. The method of claim 9 further including providing synchronized first and second two-dimensional images for simultaneous viewing on the first and second displays respectively.

12. The method of claim 11 further including providing a series of synchronized sequential first and second two-dimensional images to the monocular device and the second display.

13. The method of claim 9 further including providing synchronized alternating first and second two-dimensional images for viewing in a repeating alternating fashion on the first display and the second display respectively.

14. The method of claim 9 further including providing wireless communication to the monocular device.

15. The method of claim 9 wherein the first two-dimensional images have a lower resolution than the second two-dimensional images.

16. The method of claim 9 wherein the first two-dimensional images have a lower bit depth than the second two-dimensional images.

17. The method of claim 9 wherein the first display is a see-through display.

\* \* \* \* \*